(12) United States Patent
Benedetti (10) Patent No.: US 7,179,013 B2
(45) Date of Patent: *Feb. 20, 2007

(54) SELF CENTERING SILL PLATE RETAINER WITH OPPOSING WINGS

(75) Inventor: Steven M Benedetti, Sterling Heights, MI (US)

(73) Assignee: Newfrey LLC, Newark, DE (US)

(*) Notice: Subject to any disclaimer, the term of this patent is extended or adjusted under 35 U.S.C. 154(b) by 183 days.

This patent is subject to a terminal disclaimer.

(21) Appl. No.: 10/842,355

(22) Filed: May 10, 2004

(65) Prior Publication Data

US 2004/0240932 A1    Dec. 2, 2004

Related U.S. Application Data

(60) Provisional application No. 60/474,833, filed on May 30, 2003.

(51) Int. Cl.
*B25G 3/36* (2006.01)

(52) U.S. Cl. .................. 403/388; 403/397; 403/408.1; 403/326; 411/512; 411/913; 24/297; 24/292; 24/453

(58) Field of Classification Search .................. 24/297, 24/292, 453; 411/50–512, 913; 403/388, 403/397, 329, 408.1, 326
See application file for complete search history.

(56) References Cited

U.S. PATENT DOCUMENTS

| | | |
|---|---|---|
| 2,815,554 A | 12/1957 | Pieper |
| 3,018,529 A | 1/1962 | Perrochat |
| 3,029,486 A | 4/1962 | Raymond |
| 3,183,030 A | 5/1965 | Schleuter |
| 3,703,747 A | 11/1972 | Hamman |
| 3,810,279 A | 5/1974 | Swick et al. |
| 3,988,808 A | 11/1976 | Poe et al. |
| 4,176,428 A | 12/1979 | Kimura |
| 4,261,243 A | 4/1981 | Palmer |
| 4,363,160 A * | 12/1982 | Wibrow ....................... 24/297 |
| 4,505,611 A | 3/1985 | Nagashima et al. |
| 4,517,711 A | 5/1985 | Tanaka |
| D293,883 S | 1/1988 | Hirohata |
| 4,716,633 A | 1/1988 | Rizo |
| 4,750,878 A | 6/1988 | Nix et al. |

(Continued)

FOREIGN PATENT DOCUMENTS

EP    1 059 461    12/2000

(Continued)

*Primary Examiner*—Daniel P. Stodola
*Assistant Examiner*—Nahid Amiri
(74) *Attorney, Agent, or Firm*—Harness, Dickey & Pierce P.L.C.

(57) ABSTRACT

A one-piece molded apparatus includes a first body section having a head, a skirt, a pair of support posts joined to the skirt, and a first engagement wing. A second body section includes a second engagement wing, and a living hinge joining the second wing to the support posts. The second wing rotates about the living hinge and engages with the support posts such that at least the second wing can thereafter deflect. In another embodiment, a dog-house assembly is provided on a trim piece to mate with the apparatus. In still another embodiment, a method for forming the fasteners is provided. In yet another embodiment, a method to attach a trim piece to a vehicle is provided.

8 Claims, 7 Drawing Sheets

U.S. PATENT DOCUMENTS

| | | | |
|---|---|---|---|
| 4,810,147 A | 3/1989 | Hirohata | |
| 4,861,208 A | 8/1989 | Boundy | |
| 4,867,599 A | 9/1989 | Sasajima | |
| 4,874,276 A | 10/1989 | Iguchi | |
| 4,927,287 A * | 5/1990 | Ohkawa et al. | 403/408.1 |
| 4,932,105 A | 6/1990 | Muller | |
| 5,168,604 A | 12/1992 | Boville | |
| 5,195,793 A | 3/1993 | Maki | |
| 5,339,491 A | 8/1994 | Sims | |
| 5,448,809 A | 9/1995 | Kraus | |
| 5,494,392 A | 2/1996 | Vogel et al. | |
| 5,507,610 A | 4/1996 | Benedetti et al. | |
| 5,531,499 A | 7/1996 | Vecchio et al. | |
| 5,542,158 A | 8/1996 | Gronau et al. | |
| 5,592,719 A | 1/1997 | Eto et al. | |
| 5,704,753 A * | 1/1998 | Ueno | 411/509 |
| 5,850,676 A | 12/1998 | Takahashi et al. | |
| 6,049,952 A | 4/2000 | Mihelich et al. | |
| 6,253,423 B1 | 7/2001 | Friedrich et al. | |
| 6,322,126 B1 * | 11/2001 | Kraus | 24/297 |
| 6,371,550 B2 | 4/2002 | Iwatsuki et al. | |
| 6,438,804 B1 | 8/2002 | Romero Magarino | |
| 6,453,522 B1 | 9/2002 | Romero Magarino et al. | |
| 6,474,921 B1 | 11/2002 | Gordon | |
| 6,514,023 B2 * | 2/2003 | Moerke | 411/45 |
| 6,644,902 B1 | 11/2003 | Cutshall | |
| 6,648,542 B2 * | 11/2003 | Smith et al. | 403/291 |
| 6,669,274 B2 | 12/2003 | Barnard et al. | |
| 6,715,185 B2 | 4/2004 | Angellotti | |
| 2002/0043041 A1 | 4/2002 | Yoyasu | |
| 2003/0000048 A1 | 1/2003 | Boville | |
| 2003/0159256 A1 | 8/2003 | Clarke | |
| 2004/0047705 A1 | 3/2004 | Cutshall | |
| 2004/0223805 A1 * | 11/2004 | Benedetti et al. | |

FOREIGN PATENT DOCUMENTS

| | | |
|---|---|---|
| FR | 84 950 | 5/1995 |
| FR | 2 748 300 | 11/1997 |
| GB | 1 065 914 | 4/1967 |
| GB | 2 316 707 A | 3/1998 |
| JP | 11125224 A | 5/1999 |
| WO | WO 9911154 A1 | 3/1999 |

* cited by examiner

SELF CENTERING SILL PLATE RETAINER WITH OPPOSING WINGS

This application claims the benefit of U.S. Provisional Application No. 60/474,833, filed May 30, 2003.

FIELD OF THE INVENTION

The present invention relates generally to fasteners and more specifically to a fastener design for joining trim pieces to the surfaces of automobiles.

BACKGROUND OF THE INVENTION

For automotive applications, fasteners are used to join trim pieces to sections or metal body portions of the automobile. The requirements for these fasteners are that they be insertable into apertures of the automobile and meet standards for both insertion pressure of the insert as well as minimum pullout retention force such that the insert can be removed without damaging the trim piece. Common fastener designs include two or more flexible wings which deflect inwardly upon insertion of the fastener and expand by spring force to hold the fastener within a slot formed in the automobile. A drawback of commonly used fasteners is the inability of the fastener to compensate for misalignment between the fastener location and the aperture in the automobile. A further drawback is the inability of commonly used fasteners to accommodate slight rotation of the assembled joint in order to compensate for further misalignment between the fastener and the aperture of the automobile. Still another drawback of some existing fastener designs is an all metal body of the fastener itself. An all-metal fastener can result in corrosion between the metal contact surfaces between the fastener and the automobile as well as causing damage to the area of the aperture of the automobile upon insertion of the fastener or removal of the fastener.

Some fastener designs have a further drawback by requiring two pieces. In one application, a fastener body is insertable into an aperture and a second piece is inserted into the first piece to expand the first piece, thus holding the fastener in position. This obviously increases complexity of assembly as well as requiring the cost and maintenance of a two part system during vehicle construction.

SUMMARY OF THE INVENTION

According to the preferred embodiment of the present invention, a one-piece molded apparatus for joining accessories to panels of vehicles includes a first body section having a head, a skirt having the head supported from an upper side thereof, a pair of support posts extending perpendicularly from an underside of the skirt, and a first engagement wing joined between the pair of support posts and the underside of the skirt. A second body section includes a second engagement wing and a living hinge joining the second wing to the pair of support posts. The second wing rotates about the living hinge to engage with the pair of support posts such that at least the second wing is capable of deflection after engagement with the pair of support posts.

The second or deflectable wing includes a pair of male-shaped ears on opposed sides of the wing which engage a pair of retention elements joined to each of the support posts. When the male ear is engaged in the retention elements, the second wing is prevented from returning to its initial position but is still deflectable in an inward direction to allow insertion of the fastener into an aperture of the vehicle.

To use the fastener of the present invention, a dog-house assembly is preferably molded to a trim piece such that the dog-house includes a surface having a V-shaped slot adjacent a generally circular opening. The V-shaped anti-rotation element of the fastener is engaged with the V-shaped retention slot and the head of the fastener is positioned below the surface of the dog-house to retain the fastener during insertion of the fastener into an aperture of the vehicle. The support posts are then aligned with the aperture in the vehicle and the second wing deflects inwardly when the support posts are inserted into the aperture of the vehicle. When insertion is complete, the second wing returns by spring force of the living hinge to engage the fastener with the vehicle. In another embodiment of the present invention, a system for fastening a trim piece to a vehicle is provided. In still another embodiment of the present invention, a method for forming fasteners for attachment to a vehicle is provided. In yet still another embodiment, a method to attach a trim piece to a vehicle is provided.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENT

The following description of the preferred embodiment is merely exemplary in nature and is in no way intended to limit the invention, its application, or uses.

Figure 1:
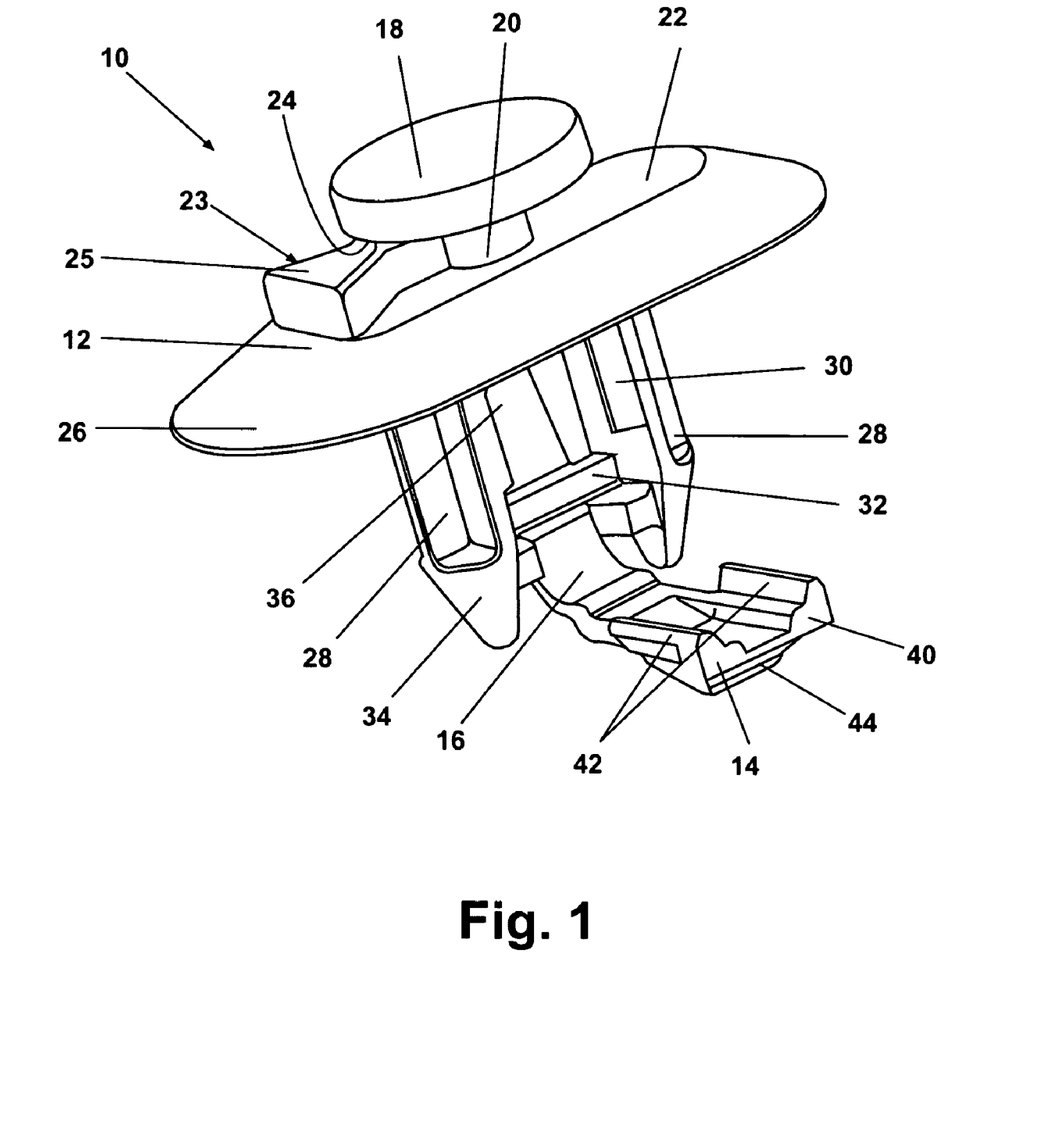
FIG. 1 is a perspective view of a self-centering sill plate retainer of the present invention showing the retainer in an as-molded condition.
Figure 2:
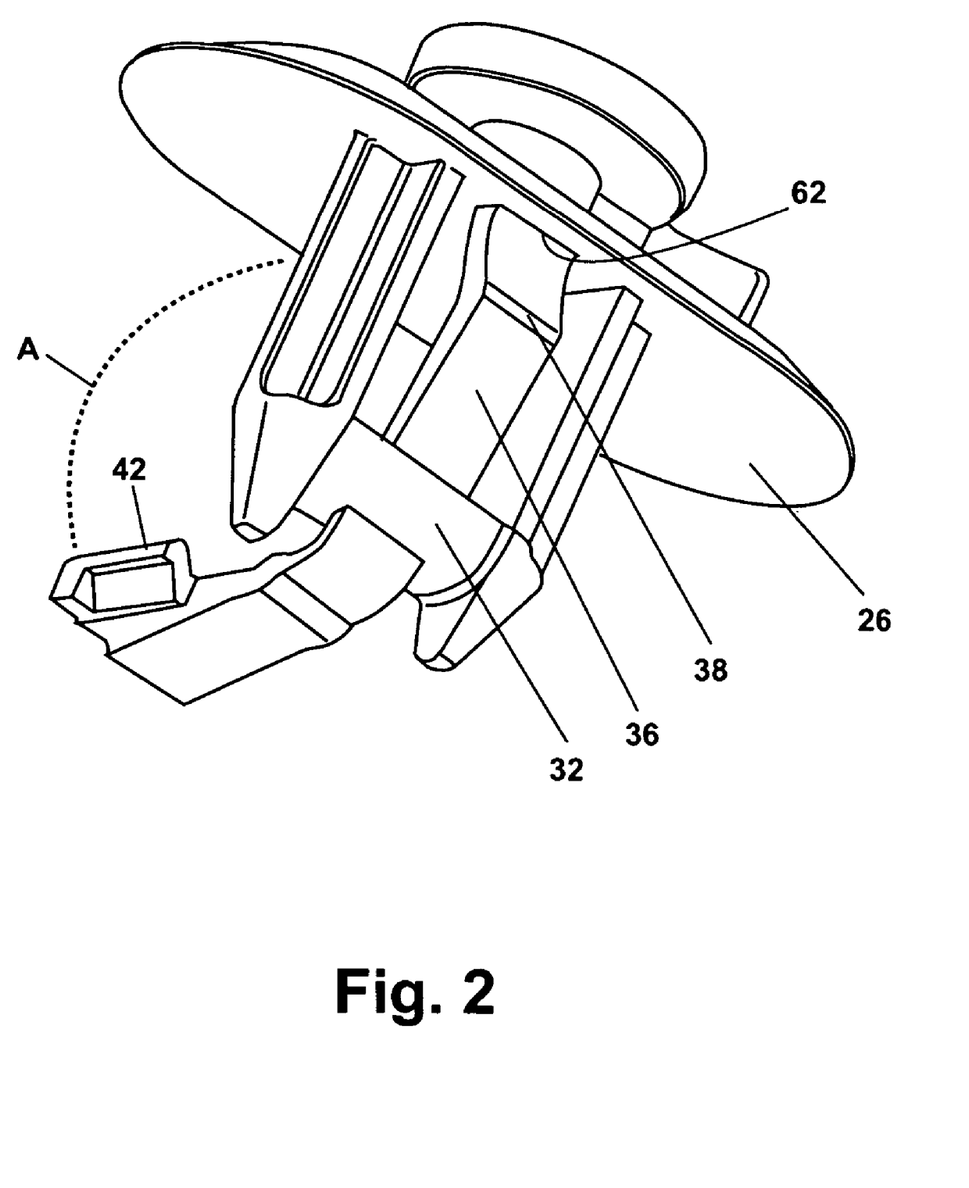
FIG. 2 is a perspective view similar to FIG. 1 showing an alternate side of the retainer of the present invention.

According to the preferred embodiment of the present invention, and as shown in FIGS. 1 and 2, a centering retainer 10 includes a first piece 12 and a second piece 14 connected to the first 12 piece by a living hinge 16. A generally circular head 18 is connected to a neck 20. The neck 20 is connected to a top surface 22. Top surface 22 is a generally planar surface extending beyond a perimeter of head 18. An anti-rotational rib 23 is co-molded with head 18 and neck 20. Anti-rotational rib 23 includes an apex 24 adjacent a perimeter of head 18 and a V-shaped body 25 extending outwardly from apex 24. Head 18, neck 20, and anti-rotational rib 23 are co-molded with top surface 22. A co-molded flexible skirt 26 radially extends outward from a perimeter of top surface 22 and at a downward directed angle therefrom.

As best seen in FIG. 2, a pair of angled support posts 28 extend perpendicularly from an under side of top surface 22. Each of the angled support posts 28 includes a retention element 30 (shown in FIG. 1), which will be described in further detail below. A bridge 32 joins distal ends of angled support posts 28. A tapered portion 34 is also formed at the distal ends of each of the angled support posts 28. A fixed wing 36 is co-molded at a first end to bridge 32 and as best seen in FIG. 2 is joined to the under side of top surface 22. An extended lip 38 is provided on fixed wing 36 extending outwardly from a plane formed by angled support posts 28.

Second piece 14 includes a body portion 40 having male ears 42 on opposite sides thereof. Each of the male ears 42 engage one of the retention elements 30 of angled support posts 28 when second piece 14 is rotated along rotation arc "A" about living hinge 16. Similar to fixed wing 36, body portion 40 includes an extended lip 44. The purpose for extended lip 38 and extended lip 44 will be described in further detail in reference to FIG. 4.

Figure 3:
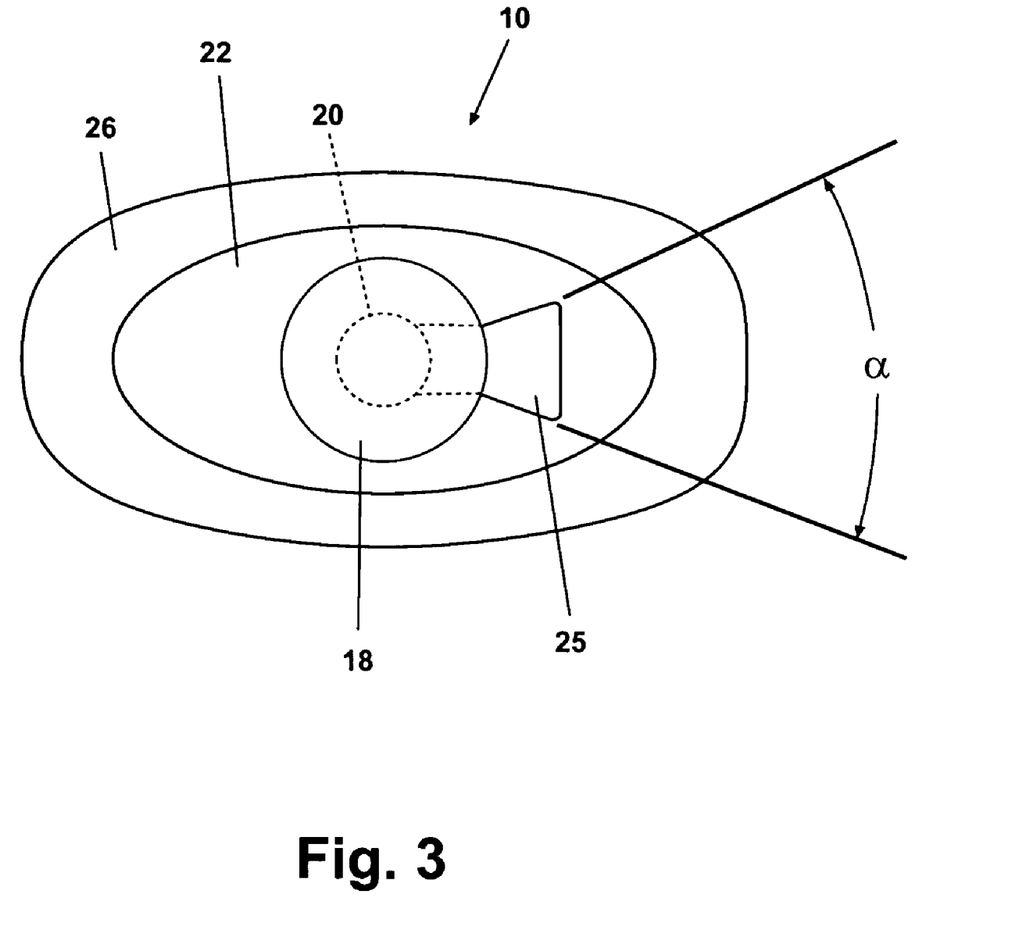
FIG. 3 is a plan view of the retainer of the present invention.

As best seen in FIG. 3, both head 18 and neck 20 are formed having a generally circular shape. The circular shape of head 18 is exemplary in that optional shapes including oblong and rectangular can also be used. Anti-rotational rib 23 forms an angle a as it extends from the perimeter of head 18.

Figure 4:
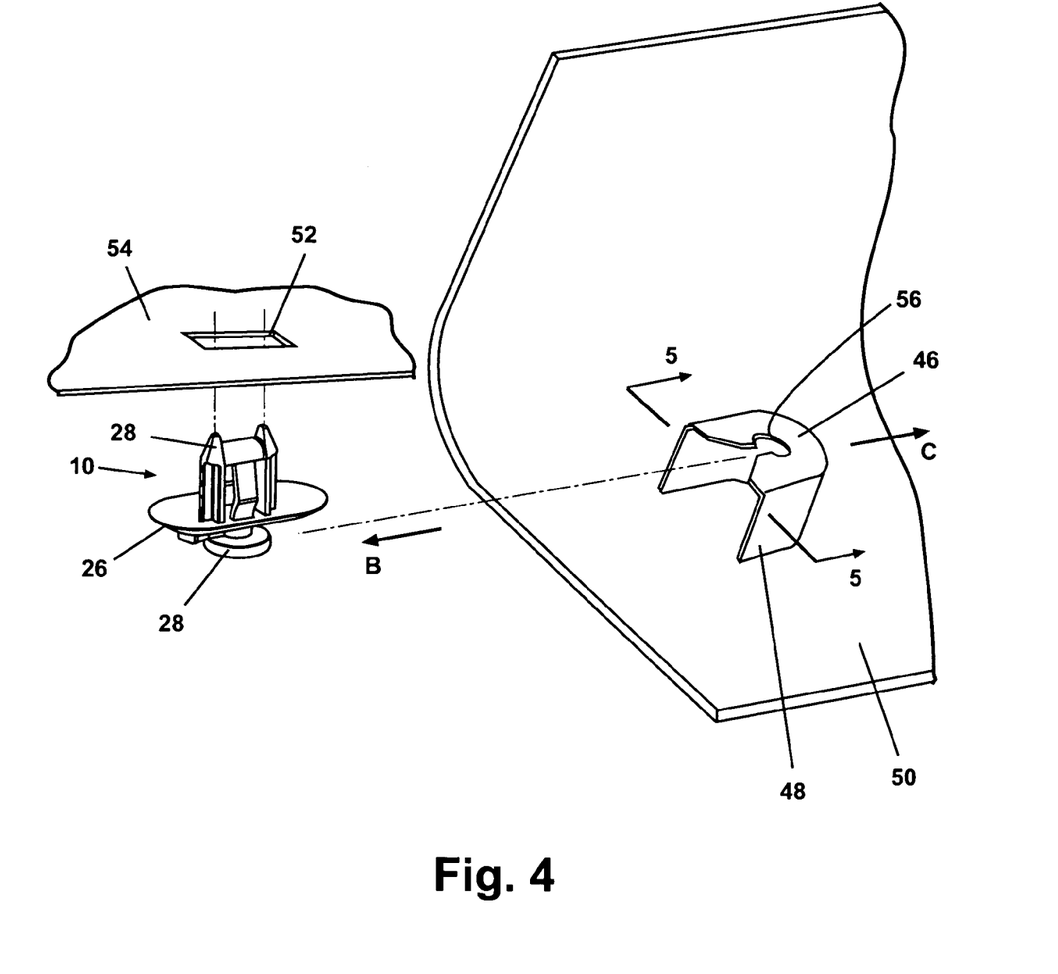
FIG. 4 is a perspective view of an assembly sequence for joining a retainer of the present invention to a dog-house assembly of a trim piece and to an aperture of a vehicle.
Figure 5:
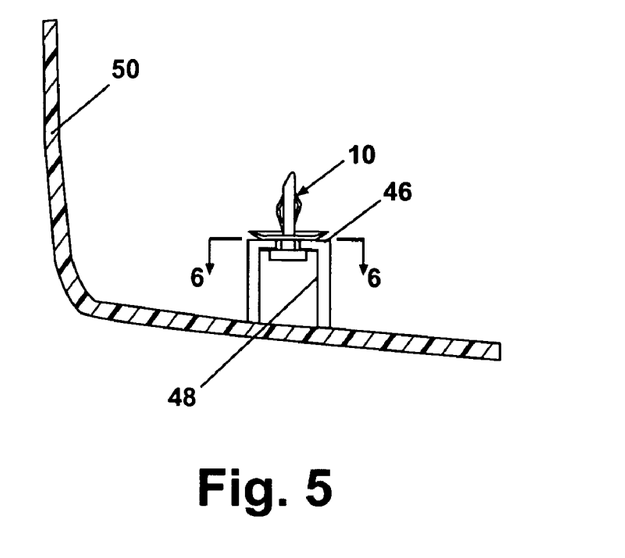
FIG. 5 is a cross-sectional view taken at Section 5—5 of FIG. 4 showing a retainer of the present invention assembled into a dog-house assembly.
Figure 6:
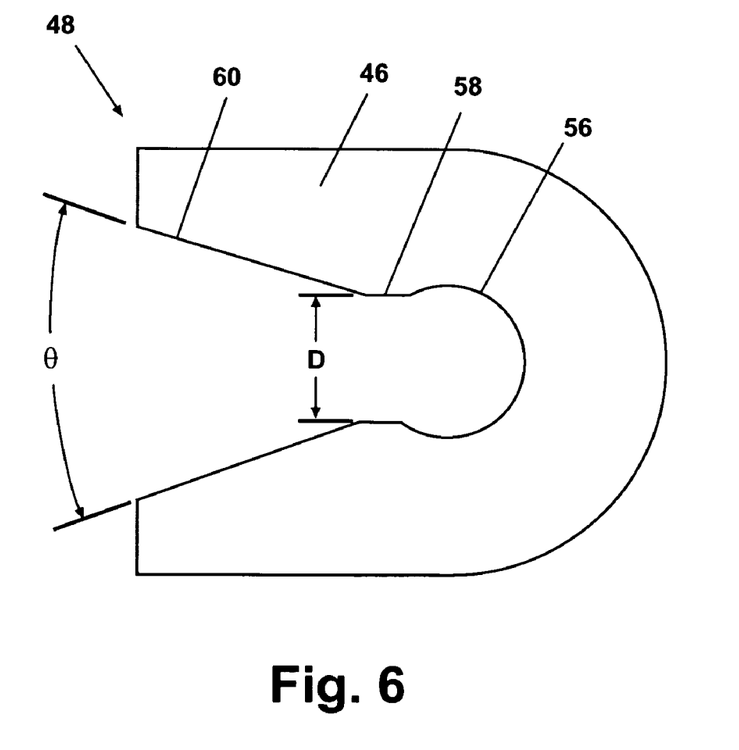
FIG. 6 is a plan view of the top surface of a dog-house assembly configured to mate with a retainer of the present invention.

Referring next to FIGS. 4–6, a mating face 46 of a dog-house assembly 48 is shown. Dog-house assembly 48 is mounted on a trim piece 50. In the preferred embodiment, dog-house 48 and trim piece 50 are co-molded of a polymeric material. To join centering retainer 10 to dog-house 48, anti-rotational rib 23 (only partially shown in FIG. 4) is oriented in the direction of arrow "B". Thereafter, head 18 is positioned below a surface of mating face 46 and both flexible skirt 26 and top surface 22 are positioned above a surface of mating face 46. Angled support posts 28 are then inserted into a rectangular shaped slot 52 of a sill plate 54 of a vehicle (not shown).

To install to mating face 46, centering retainer 10 is pressed in the direction of arrow "C" such that neck 20 engages within an aperture 56 of mating face 46. A throat region 58 is sized slightly smaller, approximately 0.18 mm, (0.007 in) smaller than a diameter of neck 20. A throat region width "D" is shown in an exaggerated view in FIG. 6 to identify the narrowing of throat region 58. Once neck 20 is fully engaged within aperture 56, anti-rotational rib 23, having angle a (shown in FIG. 3), engages within a V-shaped slot 60 of mating face 46. V-shaped slot 60 includes a slot angle θ approximating anti-rotational rib angle α. V-shaped slot 60 thereby prevents excessive rotation of centering retainer 10. V-shaped slot 60 is formed such that centering retainer 10 is able to rotate within approximately seven degrees of a nominal installed position such that centering retainer 10 installed on dog-house 48 is capable of slight rotation to accommodate misalignment between centering retainer 10 and rectangular shaped slot 52. As shown in FIG. 5, when installed, head 18 is positioned on a first side of mating face 46 and flexible skirt 26, angled support post 28 and both first piece 12 and second piece 14 of centering retainer 10 are positioned on an opposite side of mating face 46.

To prepare centering retainer 10 for insertion into rectangular slot 52, second piece 14 is first rotated about rotation arc A (shown in FIG. 2), until male ears 42 extend beyond retention elements 30 and a spring force provided by living hinge 16 retains male ears 42 in contact with retention elements 30. Second piece 14 is thereafter allowed to further rotate toward fixed wing 36 to permit installation of centering retainer 10 into rectangular slot 52. Tapered portions 34 (shown in FIG. 1), are provided to assist in aligning angled support posts 28 with rectangular slot 52 prior to and during initial stages of insertion. When angled support posts 28 are fully inserted into rectangular slot 52, extended lip 38 and extended lip 44 engage a lower surface of sill plate 54 to retain centering retainer 10 in a removable contact position with sill plate 54. The spring force of living hinge 16 provides the retention force necessary to maintain second piece 14 and fixed wing 36 in contact with sill plate 54. Also, in the installed position, flexible skirt 26 provides a moisture and dirt seal between centering retainer 10 and sill plate 54. Centering retainer 10 is designed to provide industry standard requirements for both insertion force and pull-out force, such that centering retainer 10 can be removed and trim piece 50 removed from sill plate 54. An insertion force as low as approximately 2 pounds and a removal force of up to approximately 40 pounds are provided by centering retainer 10.

In the preferred embodiment of the present invention, distal end 62 of fixed wing 36 (shown in FIG. 2), is co-molded to an under side of top surface 22. In an alternate embodiment of the present invention, fixed wing 36 can be converted to a second deflection wing by molding fixed wing 36 only to bridge 32 and providing distal end 62 as a free end, not connected to top surface 22. In this embodiment, both body portion 40 and fixed wing 36 (now acting as a deflectable wing) will deflect towards each other upon insertion of angled support posts 28 into rectangular shaped slot 52.

Figure 7:
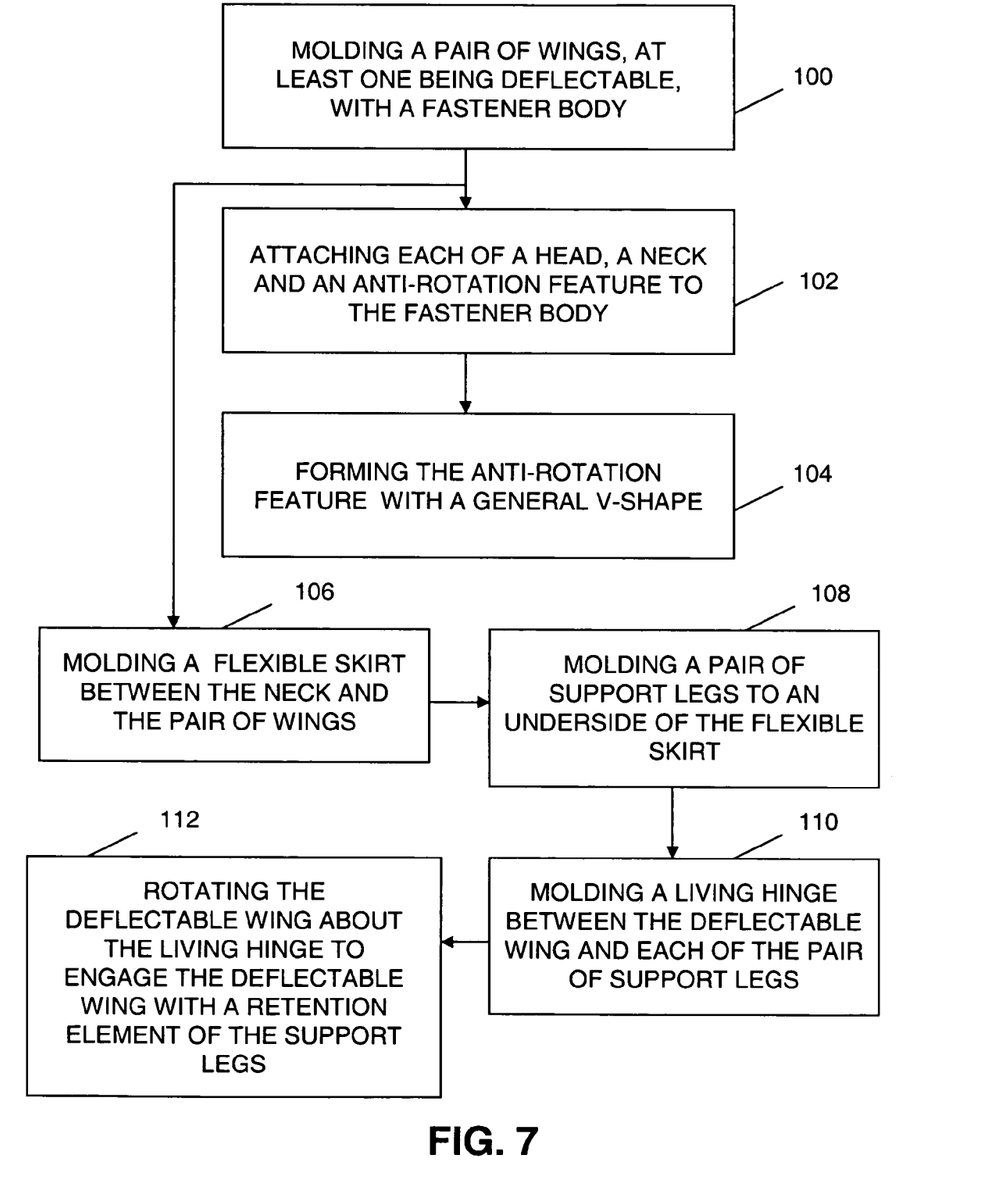
FIG. 7 is a flow chart providing the method steps for forming a retainer of the present invention.

Referring to FIG. 7, in a molding step 100, a fastener body is molded having a pair of wings, at least one of the wings being deflectable. In an attaching step 102, a head, a neck and an anti-rotation feature are attached by molding to the fastener body. In a next step 104, the anti-rotation feature is formed with a general V-shape. At a molding step 106, a flexible skirt is molded between the neck and the pair of wings. In still a further step 108, a pair of support legs are molded to an underside of the flexible skirt. At step 110, a living hinge is molded between the deflectable wing and each of the pair of support legs. At a final step 112, the deflectable wing is rotated about the living hinge to engage the deflectable wing with the retention element of the support legs.

Figure 8:
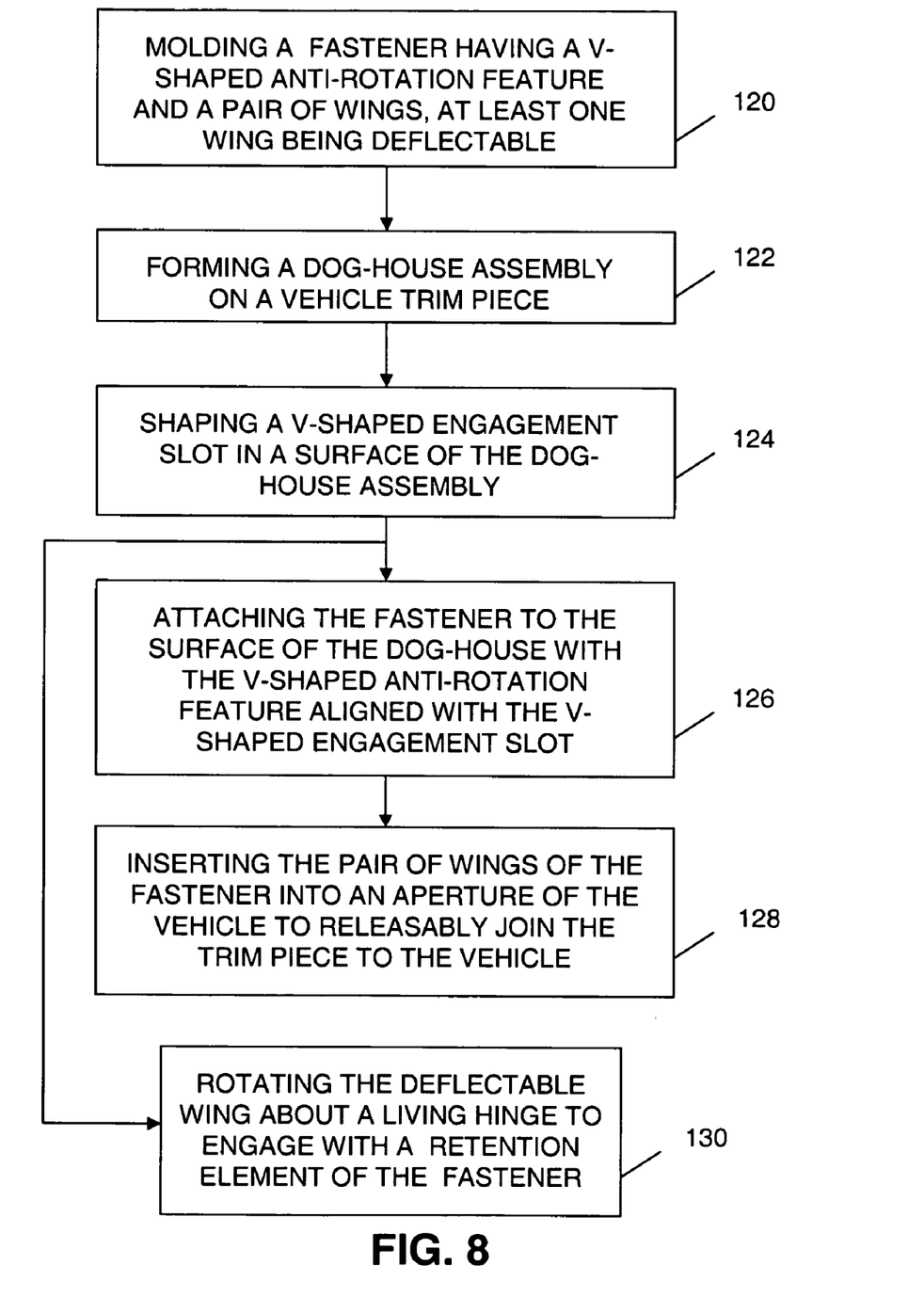
FIG. 8 is a flow chart identifying a method for attaching a trim piece to a vehicle using a retainer of the present invention.

Referring to FIG. 8, during a step 120, a fastener having a V-shaped anti-rotation feature and a pair of wings is molded, with at least one of the wings being deflectable. At step 122, a dog-house assembly is formed on a vehicle trim piece. At a shaping step 124, a V-shaped engagement slot is shaped in a surface of the dog-house assembly. In a step 126, the fastener is attached to the surface of the dog-house assembly with the V-shaped anti-rotation feature aligned with the V-shaped engagement slot. In step 128, the pair of wings of the fastener are inserted into an aperture of the vehicle to releasably join the trim piece to the vehicle. In a final parallel step 130, the deflectable wing is rotated about a living hinge to engage with a retention element of the fastener.

A centering retainer of the present invention provides several advantages. The centering retainer is molded to form a one-piece fastener made from an elastomeric material. By molding using an elastomeric material, the geometries of the centering retainer of the present invention can be formed at relatively low cost. By providing centering retainer 10 in an entirely elastomeric material, corrosion between the trim piece and the sill plate of the vehicle is further reduced. By mounting second piece 14 via the living hinge of the present invention to the centering retainer, a one-piece, simplified construction for the centering retainer is provided. By co-molding the anti-rotational rib of the present invention formed as a generally V-shaped body, a small amount of rotation of the fastener can be designed in while preventing rotation sufficient to misalign the centering retainer with the rectangular shaped slot of the vehicle.

The description of the present invention is merely exemplary in nature and, thus, variations that do not depart from the gist of the invention are intended to be within the scope of the invention. Such variations are not to be regarded as a departure from the spirit and scope of the invention.

The centering retainer of the present invention is not limited to the specific shapes shown herein. For example, and as noted herein, the head shape can be modified from that shown without departing from the gist of the present invention. In addition, the general shape of the flexible skirt, the angled support posts, and the top surface can be modified from that shown herein to permit a larger retainer, a smaller retainer, or to suit a particular installation tolerance. The V-shaped anti-rotational rib and V-shaped slot of the present invention can also be modified such that a larger or smaller angle can be employed or a more rounded shape of the anti-rotational rib can be used. A downward angle formed by the flexible skirt of the present invention can be modified to suit the material thicknesses of the sill plate and/or the trim piece of the present invention. A flexible skirt having an essentially planar shape can also be used without departing from the gist of the present invention.

The invention claimed is:

1. A one-piece, molded apparatus for joining accessories to panels on the interior of vehicles, the apparatus comprising:
   a first body section including:
      a head;
      a skirt having the head supported from an upper side thereof and radially extending beyond a perimeter of the head;
      a pair of support posts extending perpendicularly from an underside of the skirt;
      a bridge rigidly connecting distal ends of the support posts; and
      a first engagement wing fixedly joined to both the bridge between the pair of support posts and the underside of the skirt; and
   a second body section including:
      a second engagement wing; and
      a living hinge joining the second wing to the pair of support posts;
   wherein the second wing is rotatable about the living hinge to engage with the pair of support posts such that the second wing is operable to deflect only between the pair of support posts and the first wing after engagement with the pair of support posts.

2. The apparatus of claim 1, comprising an elastomeric material.

3. The apparatus of claim 1, further comprising a neck positioned between the head and the upper side of the skirt.

4. The apparatus of claim 1, comprising a tapered lead-in formed at a distal end of each of the support posts.

5. The apparatus of claim 1, wherein the bridge defines an attachment location for the living hinge between the support posts.

6. A one-piece, molded apparatus for joining accessories to panels on the interior of vehicles, the apparatus comprising:
   a first body section including:
      a head;
      a skirt having the head supported from an upper side thereof and radially extending beyond a perimeter of the head;
      a neck positioned between the head and the upper side of the skirt;
      a pair of support posts extending perpendicularly from an underside of the skirt; and
      a first engagement wing joined between the pair of support posts and the underside of the skirt;
   a second body section including:
      a second engagement wing; and
      a living hinge joining the second wing to the pair of support posts; and
   a generally planar portion of the skirt, having the neck and an anti-rotation feature supported from an upper surface thereof and the support posts connected to an under surface thereof, the skirt extending at an angle generally downward from the head;
   wherein the second wing is rotatable about the living hinge to engage with the pair of support posts such that at least the second wing is capable of deflection after engagement with the pair of support posts.

7. The apparatus of claim 6, wherein the anti-rotation feature is generally formed in a "V" shape having an apex located approximate the perimeter of the head and a body portion extending distally therefrom on the planar portion of the skirt.

8. A one-piece, molded apparatus for joining accessories to panels on the interior of vehicles, the apparatus comprising:
   a first body section including:
      a head;
      a skirt having the head supported from an upper side thereof and radially extending beyond a perimeter of the head;
      a pair of support posts extending perpendicularly from an underside of the skirt; and
      a first engagement wing joined between the pair of support posts and the underside of the skirt;
   a second body section including:
      a second engagement wing; and
      a living hinge joining the second wing to the pair of support posts;
   a bridge joining distal ends of the support posts and forming an attachment location for both the living hinge and the first engagement wing between the support posts;
   a pair of male ears each joined to one of an opposed pair of sides of the second wing; and
   a pair of retention elements each joined to one of the support posts;
   wherein the second wing is rotatable about the living hinge to engage with the pair of support posts such that at least the second wing is capable of deflection after engagement with the pair of support posts; and
   wherein each of the male ears engages one of the pair of retention elements following rotation of the second wing about the living hinge to thereafter allow only a limited inward deflection of the second wing about the living hinge.

* * * * *